HAYDN M. BAKER, OF WASHINGTON, DISTRICT OF COLUMBIA.

Letters Patent No. 86,201, dated January 26, 1869.

IMPROVEMENT IN THE MANUFACTURE OF SULPHUR AND CHLORINE.

The Schedule referred to in these Letters Patent and making part of the same.

*To all whom it may concern:*

Be it known that I, HAYDN M. BAKER, of the city of Washington, in the District of Columbia, have invented a new and useful Process for the Manufacture of Sulphur and Chlorine-Gas from Sulphurous and Hydrochloric Acids, and that the following is a full and exact description thereof.

My invention is based upon the principle of decomposition of anhydrous, sulphurous, and hydrochloric acids in lead or clay chambers, the reaction being represented by the following equation:

$SO_2 + 2HCl = S, 2HO$ and $2Cl$.

The lead chamber in which these decompositions are effected is of peculiar construction, and capable of distension, like a gasometer, to increase capacity, and will therefore be made the subject of another patent, belonging to the classes relating to apparatus.

For the source of sulphurous acid, I use iron or copper pyrites; or, when the object is the manufacture of chlorine-gas, one may use sulphur, forming the sulphurous acid by combustion.

For manufacturing chlorine-gas alone, if the sulphur were used, it would obviate the necessity of a reverberatory furnace for roasting pyrites; and, as the sulphur is recovered and used repeatedly, it may be considered the more economical way to use that substance; but the advantage of using pyrites would be, that one would not only produce two products, (sulphur and chlorine,) but also metallic iron or metallic copper, by reducing the oxides of those metals left after roasting the sulphurets.

I will now make known my method of working the invention, which is exceedingly simple.

I produce sulphurous acid by roasting copper or iron pyrites, or by combustion of sulphur, and simultaneously distil aqueous hydrochloric acid, and pass the vapors of said hydrochloric acid, and the sulphurous-acid gas, through a series of vessels containing fused chloride of calcium. It is proper to have a series of chloride-of-calcium vessels for each acid. By these means the water is extracted from each acid by the chloride of calcium, and the vapors or gases of the acids are then forced into the lead chamber, where they commence decomposing each other, forming some free sulphur and chlorine, and also water.

On account of the formation of water in the decompositions, it is necessary to have chloride of calcium in the lead chamber, to absorb the said water as fast as formed, otherwise the remaining free chlorine would unite with the hydrogen of the water, forming hydrochloric acid, and the oxygen would pass to a portion of the sulphur, forming sulphurous acid again.

It will therefore readily occur to a chemist, that in order to attain anything like the theoretic quantity of chlorine and sulphur, the use of the chloride of calcium is indispensable.

After the reactions are complete, the chlorine may be made to combine with hydrate of lime, forming oxychloride of calcium, (bleaching-powders,) and the sulphur and chloride of calcium removed.

Chemists well know the value of chlorine as an oxidizing-agent in presence of water, for numerous purposes in manufacture.

The chloride of calcium dissolves in a small quantity of water, and leaves the sulphur undissolved, which may be caught on a filter and washed, and is then fit for any industrial purpose for which it is applicable.

The solution of chloride of calcium may now be evaporated to dryness, and fused, and is then ready for use in dehydrating succeeding quantities of sulphurous and hydrochloric-acid gases.

The advantages of this invention are, that it affords the means of making all the products available from auriferous and argentiferous pyrites at a moderate cost, and with a correspondingly moderate capital.

Claim.

What I claim as my invention, and desire to secure by Letters Patent, is—

The process herein described, for the manufacture of sulphur and chlorine from anhydrous, hydrochloric, and sulphurous-acid gases, in the presence of chloride of calcium or any other agent possessing a powerful affinity for water, which would not enter into combination with the resulting chlorine or sulphur.

HAYDN M. BAKER.

Witnesses:
JOHN B. CLARK, Jr.,
R. H. MARSH.